United States Patent
Therrien et al.

(10) Patent No.: US 10,247,851 B2
(45) Date of Patent: Apr. 2, 2019

(54) HYBRID FIBER OPTIC CABLE FOR DISTRIBUTED SENSING

(71) Applicant: Halliburton Energy Services, Inc., Houston, TX (US)

(72) Inventors: Jason Edward Therrien, Cypress, TX (US); John L. Maida, Houston, TX (US); David Barfoot, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 64 days.

(21) Appl. No.: 15/311,853

(22) PCT Filed: Aug. 25, 2014

(86) PCT No.: PCT/US2014/052489
§ 371 (c)(1),
(2) Date: Nov. 17, 2016

(87) PCT Pub. No.: WO2016/032420
PCT Pub. Date: Mar. 3, 2016

(65) Prior Publication Data
US 2018/0180766 A1   Jun. 28, 2018

(51) Int. Cl.
*G01V 8/16* (2006.01)
*G01V 8/12* (2006.01)
(Continued)

(52) U.S. Cl.
CPC .............. *G01V 8/16* (2013.01); *E21B 47/123* (2013.01); *E21B 49/00* (2013.01); *G01V 1/226* (2013.01);
(Continued)

(58) Field of Classification Search
CPC .......... E21B 47/123; G01V 8/16; G01V 8/12; G01D 5/35383; G01D 5/35303;
(Continued)

(56) References Cited

U.S. PATENT DOCUMENTS 4,996,419 A    2/1991  Morey
7,308,162 B2 * 12/2007  Wang ..................... G01L 1/242
                                                    385/10
(Continued)

FOREIGN PATENT DOCUMENTS

EP          910725       7/2003
JP        2007139482     6/2007

OTHER PUBLICATIONS

International Patent Application No. PCT/US2014/052489, International Search Report and Written Opinion dated May 22, 2015, 15 pages.

*Primary Examiner* — Taeho Jo
(74) *Attorney, Agent, or Firm* — Kilpatrick Townsend & Stockton LLP (57) ABSTRACT

A hybrid fiber optic assembly and system for use in a well, where the system includes a hybrid fiber optic cable with at least a first transmission region and at least a first sensory region as well as an interrogator system coupled to the hybrid fiber optic cable. The hybrid fiber optic cable can have a plurality of transmission regions and sensory regions, as well as transition regions in between and coupling individual pairs of transmission regions and sensory regions.

19 Claims, 5 Drawing Sheets

(51) Int. Cl.
*G01V 1/42* (2006.01)
*G01V 1/22* (2006.01)
*E21B 47/12* (2012.01)
*G02B 6/00* (2006.01)
*E21B 49/00* (2006.01)
*E21B 43/26* (2006.01)
*E21B 47/06* (2012.01)
*G01D 5/353* (2006.01)

(52) U.S. Cl.
CPC .................. *G01V 1/42* (2013.01); *G01V 8/12* (2013.01); *G02B 6/00* (2013.01); *E21B 43/26* (2013.01); *E21B 47/06* (2013.01); *E21B 47/065* (2013.01); *G01D 5/35358* (2013.01); *G01V 2210/1234* (2013.01); *G01V 2210/1429* (2013.01); *G01V 2210/646* (2013.01); *G01V 2210/65* (2013.01)

(58) Field of Classification Search
CPC ........ G01D 5/35345; G01D 5/12; G01D 5/14; G01D 5/266; G01D 5/35312; G01D 5/35374
USPC ........................................ 250/269.1
See application file for complete search history.

(56) References Cited

U.S. PATENT DOCUMENTS

| | | | | |
|---|---|---|---|---|
| 9,273,548 | B2* | 3/2016 | LeBlanc | E21B 47/06 |
| 9,417,103 | B2* | 8/2016 | Chen | G01L 11/025 |
| 2002/0048439 | A1* | 4/2002 | Tsukitani | G02B 6/02014 |
| | | | | 385/123 |
| 2002/0196993 | A1* | 12/2002 | Schroeder | G01L 1/246 |
| | | | | 385/12 |
| 2003/0020631 | A1 | 1/2003 | Haase et al. | |
| 2004/0109656 | A1* | 6/2004 | Aikawa | G02B 6/02009 |
| | | | | 385/127 |
| 2004/0202437 | A1* | 10/2004 | Okuno | H01S 3/22 |
| | | | | 385/123 |
| 2005/0249503 | A1* | 11/2005 | Sun | E21B 47/12 |
| | | | | 398/135 |
| 2005/0281511 | A1* | 12/2005 | Ringgenberg | G02B 6/2558 |
| | | | | 385/70 |
| 2007/0062696 | A1* | 3/2007 | Wilson | E21B 47/123 |
| | | | | 166/254.2 |
| 2007/0104437 | A1* | 5/2007 | Bookbinder | C03B 37/01446 |
| | | | | 385/125 |
| 2007/0183782 | A1 | 8/2007 | Farr et al. | |
| 2007/0261505 | A1 | 11/2007 | Nunally et al. | |
| 2008/0030739 | A1* | 2/2008 | Hartog | G01M 11/3109 |
| | | | | 356/446 |
| 2010/0067844 | A1* | 3/2010 | Sanders | G01T 1/20 |
| | | | | 385/12 |
| 2011/0212411 | A1* | 9/2011 | Sinofsky | A61B 18/22 |
| | | | | 433/29 |
| 2011/0280277 | A1* | 11/2011 | Chung | G01K 11/32 |
| | | | | 374/137 |
| 2013/0070235 | A1* | 3/2013 | Chen | G01L 11/025 |
| | | | | 356/73 |
| 2014/0097848 | A1* | 4/2014 | LeBlanc | E21B 47/06 |
| | | | | 324/338 |
| 2014/0292530 | A1* | 10/2014 | Weerasinghe | E21B 47/122 |
| | | | | 340/854.7 |
| 2014/0347192 | A1* | 11/2014 | Barfoot | E21B 47/123 |
| | | | | 340/854.7 |
| 2015/0014521 | A1* | 1/2015 | Barfoot | E21B 47/123 |
| | | | | 250/261 |
| 2015/0060104 | A1* | 3/2015 | Colaianna | H01B 7/292 |
| | | | | 174/105 R |
| 2016/0265339 | A1* | 9/2016 | Xia | H01B 7/046 |
| 2016/0341924 | A1* | 11/2016 | Park | G02B 6/4416 |
| 2017/0183958 | A1* | 6/2017 | Zeng | E21B 47/102 |

* cited by examiner

HYBRID FIBER OPTIC CABLE FOR DISTRIBUTED SENSING

CROSS-REFERENCE TO RELATED APPLICATIONS

This is a U.S. national phase under 35 U.S.C. 371 of International Patent Application No. PCT/US2014/052489, titled "HYBRID FIBER OPTIC CABLE FOR DISTRIBUTED SENSING" and filed Aug. 25, 2014, the entirety of which is incorporated herein by reference.

TECHNICAL FIELD

This disclosure relates to apparatus and systems using fiber optics as sensory tools in hydrocarbon wells and other wells.

BACKGROUND

In conventional wellbore or reservoir sensory and monitoring devices, the sensing element is a physical device usually placed at the end of a copper line. Fiber optic cables can be used to replace traditional sensory and monitoring devices, where the fiber itself is the sensory tool. Fiber optic cables used as wellbore sensors, as known in the industry, do not include structures or methods to focus on a region of sensing when deployed, and encounter further challenges with the transmission of signal through the full length of fiber.

BRIEF DESCRIPTION OF THE DRAWINGS

Illustrative aspects of the present disclosure are described in detail below with reference to the following drawing figures.

DETAILED DESCRIPTION

Certain aspects of the present disclosure relate to an apparatus, system, and method for forming and deploying sections of fiber optic cable (alternatively referred to as distributed sensing fiber) in a wellbore environment, where regions of the fiber optic cable have different transmissive and sensory characteristics. With fiber optic sensing, either or both of a portion of and the entire length of fiber optic cable can be used as a sensing tool, where the sensing is distributed along a given length of the fiber optic cable. In particular, a fiber optic cable can operate as both the medium for transmitting a signal that is propagated into an earth formation, and for receiving backscatter signals from the earth formation. The physical and optical characteristics of the fiber optic cable can be specialize and optimized to detect for various properties in earth strata, such as temperature, pH, density, etc., where the fiber optic cable is deployed.

Backscatter sensing involves the reflection of waves, particles, or signals back toward the direction from which the waves, particles, or signals originated. The reflection of such waves, particles, or signals is diffused, and thus the collected diffuse reflection signal can be measured and analyzed to determine characteristics of the objects or medium off of which the waves, particles, or signals reflect. Fiber optic cables can be used to transmit signals to regions of interest within a wellbore, to emit signals into the earth strata surrounding the wellbore, and to collect reflected signal (i.e. backscatter) from the earth strata and formations within the earth strata. Mathematical models used to interpret signals collected from earth strata and formations can include, but are not limited to, Rayleigh, Stokes Raman, Anti-Stokes Raman, Brillouin, and other such scattering techniques.

In particular applications of seismic monitoring and microseismic monitoring, backscatter sensing can provide a subsurface picture of fracture growth and effectiveness that is more precise and detailed than obtained with methods and tools known in the industry. However, sensory readings from any single point or depth alone, or even from multiple discrete points and depths within a wellbore, leaves for multiple possible interpretations of results and performance inconsistencies between sensors at separate stages, depths, or locations. Ambiguities resulting from single-point or multiple-point sensory detection can result in questions regarding, but not limited to, apparent microseismic overlap, whether there is stage communication in the reservoir, the chance that a plug is leaking, or the possibility of poor cement quality at the location of the sensor. With distributed fiber optic sensing, across a length of fiber optic cable, analyzing the signal reflections from different spots in the fiber provides for signal measurement with increased granularity, providing additional confidence and precision that the detected signal is representative of the surrounding earth strata and formations. Thus, whereas with methods and tools known in the industry, an operator or observer may have been limited to only a single or a few sensing points per well, with distributed sensing, an operator effectively has hundreds, thousands, or even tens of thousands of measurement points covering the entire wellbore, or a region of interest within the wellbore.

Fiber optic cable that is best suited to transmitting signals and general telemetry is generally not ideal for emitting or receiving backscatter signals. Conversely, fiber optic cable that is best suited to emitting and receiving backscatter signals is generally not ideal for transmitting signals. As the region of interest within a wellbore can be several kilometers downhole, fiber optic cable deployed for distributed sensing must have telemetry characteristics to send sufficiently strong signals downhole and allow (relatively weak)

received sensory signals to travel uphole to be detected and analyzed by equipment at the surface of a well. The fiber optic cable deployed at the region of interest, however, must also have sensory characteristics sufficient to scatter signals received from an uphole source as well as sensory characteristics sufficient to receive and relay uphole backscatter signals from earth strata and formations. Further, the temperature, chemistry, and pressure of the wellbore environment in the region of interest can be deleterious on fiber optic cable, so fiber optic cable in that region may also need to be built with characteristics to withstand harsh environmental conditions. As known in the industry, distributed sensing fiber used for such applications is a compromise, having neither ideal telemetry nor sensory characteristics; thus sensory data received for analysis is neither as precise and accurate nor has as strong a signal as desired for characterizing and interpreting data about earth strata or formations surrounding or proximate to the wellbore.

According to aspects of the present disclosure, the use of a heterogeneous fiber having different, but connected, telemetry and sensory regions, allows for the strong transmission of signal from a uphole source, the collection of detailed sensory data from backscatter signal at a region of interest downhole, and the strong transmission of collected data signal back uphole for characterizing and interpreting data about earth strata or formations surrounding or proximate to the wellbore. In some aspects, the temperature and strain of the hybrid fiber optic cable can be determined to characterize the surrounding earth strata and formations. In other aspects, the hybrid fiber optic cable can be further utilized as a series of distributed microphones or hydrophones. In further aspects, distributed fiber optic sensing as disclosed herein can be combined with multiple other subsurface diagnostic techniques, or further combined with surface hardware and fluid chemistry to maximize the amount of information and characterization for each fracking treatment.

In a project where thousands of wells may be drilled, it is critical to get the well spacing and horizontal orientation correct. If the well spacing or horizontal orientation are imprecise or incorrect, either too few wells are drilled thereby stranding valuable reserves, or too many wells are drilled, spaced too closely together and wasting material, time, and expense by drilling and completing wells that are not required. The use of a distributed sensing fiber in a horizontal portion of a wellbore can provide for a broad subterranean picture of a region of earth strata, identifying the locations, shape, and properties of formations and hydrocarbon reservoirs in earth strata with precision to avoid wasteful drilling or well completion.

The use of a hybrid fiber optic cable as in the present disclosure, particularly in its transmission region, can reduce the amount of signal light used in a region of the wellbore that is not of interest, where that light signal would effectively be wasted in a region that is not of interest. Conversely, the use of a hybrid fiber optic cable as in the present disclosure, particularly in its sensory region, can increase the amount of signal light used in a region of the wellbore that is of interest, and where that light signal would effectively be wasted if not used within the region of interest. In some aspects, a hybrid fiber optic cable can have multiple sensory regions, each with its own dynamic range, to maximize the use of light signal from a light source.

While distributed fiber optic systems are invaluable in monitoring hydraulic fracture treatments, they also provide value throughout the life of a well. After applying a fracking process to a region of earth strata or formation, the same distributed sensing fiber can be used to perform production logging or be used for long-term wellbore integrity monitoring. Moreover, tool strings deployed in wellbores are generally constructed of multiple components, segments, or sections, connected together at the surface of a well. Accordingly, at the surface of the well, additional components, segments, and sections may be added to the head of the tool string as the downhole end of the tool string descends into a wellbore, where a distributed sensing fiber can be further used to collect data on the surrounding earth strata and formations.

The illustrative examples discussed herein are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects. The following sections use directional descriptions such as "uphole," "upward," "downhole," "downward," "inward," "outward," etc. in relation to the illustrative aspects as they are depicted in the figures, the uphole direction being toward the surface of the well, the downhole direction being toward the toe of the well, the inward direction being toward the longitudinal axis (which can also be referred to as the "primary axis" or "centerline") of the tool string, casing, or mandrel, and the outward direction being away from the longitudinal axis of the tool string, casing, or mandrel. Further, portions of structural elements described herein can be referred to by their uphole or downhole ends. Similarly, portions of structural elements described herein can be referred to by their interior (inward facing) and exterior (outward facing) surfaces. Like the illustrative aspects, the numerals and directional descriptions included in the following sections should not be used to limit the present disclosure.

Further, as used herein, the term "low-loss" is generally used to refer to a section of fiber optic cable that is manufactured or fabricated to facilitate the transmission of signals over distances and at high bandwidths with a minimum of signal lost during the transmission and with a high signal-to-noise ratio. The term "high-loss", is generally used herein to refer to a section of fiber optic cable that is manufactured or fabricated to facilitate the emission and collection of signals from a fiber optic cable, and is particularly used herein in comparative relation to discussion of low-loss fiber optic cable.

Figure 1:
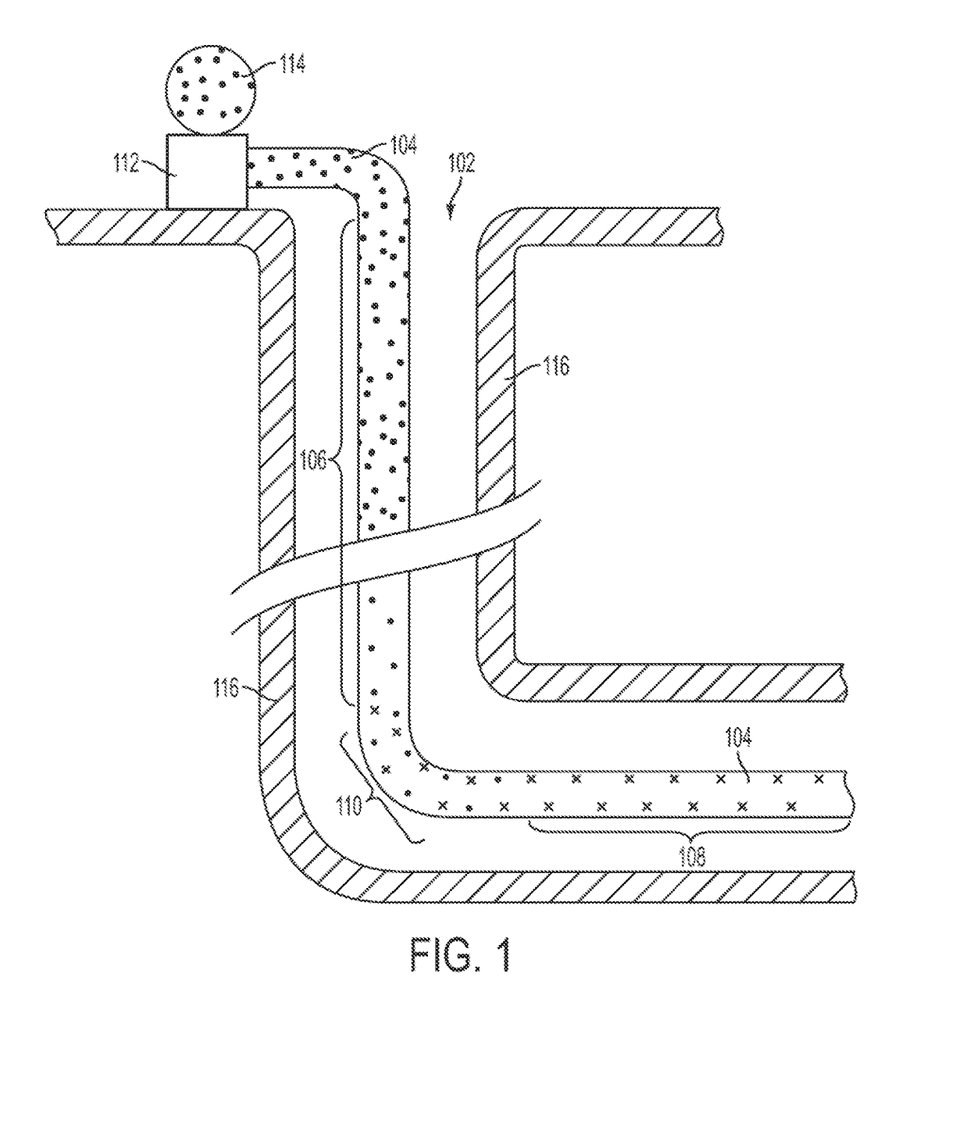
FIG. 1 is a schematic diagram of a well system in which a hybrid fiber optic cable can be deployed, according to some aspects of the present disclosure.

FIG. 1 is a schematic diagram of a well system 100 in which a hybrid fiber optic cable 104 can be deployed. Deployed within a wellbore 102, the hybrid fiber optic cable 104 includes a transmission region 106 (alternatively referred to as a transmission regime or a telemetry regime) and a sensory region 108 (alternatively referred to as a sensory region or a backscatter regime). The transmission region 106 and the sensory region 108 can be connected to each other as part of the same hybrid fiber optic cable 104 through a transition region 110. In some aspects, the transition region 110 can be a splicing of transmission region 106 fiber optic cable with sensory region 108 fiber optic cable (as shown in FIG. 1). In other aspects, the transition region 110 can be a flat or blunt end of transmission region 106 fiber optic cable mechanically and optically coupled to a flat or blunt end of sensory region 108 fiber optic cable. In further aspects, the splice of transmission region 106 with the sensory region 108 can be angled cleave where the two ends of the cut transmission region 106 fiber optic cable and sensory region 108 fiber optic cable mirror each other. The head of the hybrid fiber optic cable 104 is coupled at the surface of the wellbore 102 to an interrogator system 112, such that the hybrid fiber optic cable 104 is both mechanically and optically coupled to the interrogator system 112. In some aspects, when a hybrid fiber optic cable 104 is deployed in a wellbore 102, not the entire length of the hybrid fiber optic cable 104 will need to be deployed, or will not fit in the wellbore 102. In such cases, some of the cable can be kept at the surface of the wellbore 102 as a fiber optic coil 114. (When the fiber optic coil 114 is extended or unrolled, it is then again referred to as hybrid fiber optic cable 104.)

The hybrid fiber optic cable 104 has different physical and optical characteristics in its transmission region 106 and sensory region 108. In particular, the transmission region 106 is manufactured or fabricated to be a "low-loss" region of fiber optic. In other words, the composition of the transmission region 106 fiber is fabricated to maximize telemetry and the transmission of signals through the fiber, minimizing noise in the signal and any loss of signal. The fiber chosen or fabricated for the transmission region 106 can have a minimum of scattering sites or scattering materials/dopants such that the signal sent though the transmission region 106 has a minimal amount of interaction with the fiber. The lack of scattering sites or materials in the transmission region 106 can minimize the sensory characteristics of transmission region 106. The transmission region 106 fiber can thereby transmit signal to a sensory region 108 of the hybrid fiber optic cable 104 such that the signal remains strong and clear when the signal reaches the sensory region 108. The transmission region 106 fiber can be "pure" or "core" fiber optic cable, being manufactured to have a minimum of impurities or imperfections in the fiber optic lines. In further aspects, transmission region 106 fiber can be essentially homogeneous silicon oxide ($SiO_2$) without any intentionally added doping elements. In particular applications, the transmission region 106 fiber can be a section of Corning ULL, standard telecommunications fiber, or other such fiber optic cable.

The sensory region 108 fiber is manufactured or fabricated to have physical and optical characteristics that allow for backscattering sensing of the earth strata 116 where the sensory region 108 fiber is located within the wellbore. The addition or doping of sensory region 108 fiber necessarily renders the sensory region 108 fiber to be a "high-loss" section, at least in comparison to the low-loss transmission region 106 fiber. In other words, the composition of the sensory region 108 fiber is fabricated to specifically and particularly scatter incoming signals through the fiber. The sensory region 108 fiber can thereby operate as a backscattering sensor, and emit signals indicative of characteristics of the surrounding earth strata 116 uphole to be collected by the interrogator system 112. Accordingly, the sensory region 108 fiber can be manufactured or fabricated to have a particular concentration intentional impurities or doping in the fiber optic lines to allow for specific backscattering detection. In some aspects, sensory region 108 fiber can be manufactured or fabricated to produce a particular backscattering profile and sensing pattern according to the wavelength of light of an incoming signal. In other aspects, sensory region 108 fiber can be doped to increase the index of refraction ($I_R$) of the fiber core (also referred to as "updoping"), which can include doping the sensory region 108 fiber core with germanium (Ge), hydrogen chloride (HCl), zirconium (Zr), or other elements. In further aspects, sensory region 108 fiber can be doped to decrease the index of refraction ($I_R$) of the fiber cladding (also referred to as "downdoping"), which can include doping the sensory region 108 fiber cladding with fluorine (F) or other elements. In particular applications, the sensory region 108 fiber can be a section of Corning MetroCor, Corning Clear Curve, Corning SMF28e+, or other such fiber optic cable. In various aspects, the sensory region 108 can be a fiber configured to accommodate or optimize any or all of Rayleigh, Brillouin, and Raman scattering.

The transition region 110 is the interface of the fiber optic cable between the transmission region 106 and the sensory region 108; in other words, the transition region 110 is a length of fiber optic cable where portions of the transmission region 106 and the sensory region 108 overlap or are otherwise coupled. Joining lengths of fiber optic cable can be accomplished in a variety of ways. Generally, an end of the transmission region 106 and an end of the sensory region 108 are cleaved to mirror each other and then spliced together with the core of each fiber optic cable aligned. In some aspects, a mechanical splice can be coupled to the transition region 110 to hold the ends the transmission region 106 and the sensory region 108 together mechanically. In other aspects, fusion splicing heats and fuses the ends of the transmission region 106 and the sensory region 108 together. In further aspects, specially constructed optical fiber connectors for temporary or semi-permanent connections can be applied. As illustrated in FIG. 1, the transition region 110 can be located in the wellbore 102 at a location where the wellbore 102 turns from a vertical region to a horizontal region. In other aspects, the transition region 110 can be located at any point along the hybrid fiber optic cable 104, in either a region of hybrid fiber optic cable 104 positioned in a vertical section of a wellbore 102, a horizontal section of a wellbore 102, a diagonal section of a wellbore 102, or any other section of a wellbore 102.

In aspects, a hybrid fiber optic cable 104 can be several kilometers long, or as long as necessary to reach the toe of any given wellbore 102. As shown in FIG. 1, a wellbore 102 can be drilled to have a horizontal region through which the hybrid fiber optic cable 104 can be deployed, where the horizontal region of the wellbore 102 is proximate to formations in the earth strata 116. In some aspects, formations in the earth strata 116 can be up to several kilometers distant from the hybrid fiber optic cable 104 in the horizontal region of the wellbore 102. The transmission region 106 and the sensory region 108 can each have an end cut or cleaved at an angle such that the two ends of fiber optic cable mirror each other, and physically couple with each other such that either or both of the core and cladding of both the transmission region 106 fiber optic cable and the sensory region 108 fiber optic cable are in alignment.

At the head of the well system 100, the hybrid fiber optic cable 104 can be mechanically and optically coupled to an interrogator system 112, which can include signal receiving, processing, and decoding components, at least one data processing system, at least one specialized computer, a communications protocol and apparatus to transmit information, and at least one interface display for observing or handling data received from the hybrid fiber optic cable 104. The interrogator system 112 can send signals into hybrid fiber optic cable 104 with a light source, which in some aspects can be a laser, which further can be configurable and controllable to send laser light at various wavelengths, frequencies, and pulses into hybrid fiber optic cable 104. In some aspects, the fiber optic coil 114 can be mounted on or coupled to the interrogator system 112, such that if further fiber optic coil 114 is deployed as hybrid fiber optic cable 104 downhole in the wellbore 102, the interrogator system 112 remains connected, mechanically and optically, to the overall hybrid fiber optic cable 104.

In alternative aspects, a draw tower (not shown) can be coupled to the interrogator system at the surface of the well system 100 (i.e. on site), and arranged to dispense hybrid fiber optic cable 104, which can be in the form of fiber optic coil 114, through or connected to the interrogator system 112, mechanically and optically, as further hybrid fiber optic cable 104 is deployed downhole in the wellbore 102.

Figure 2:
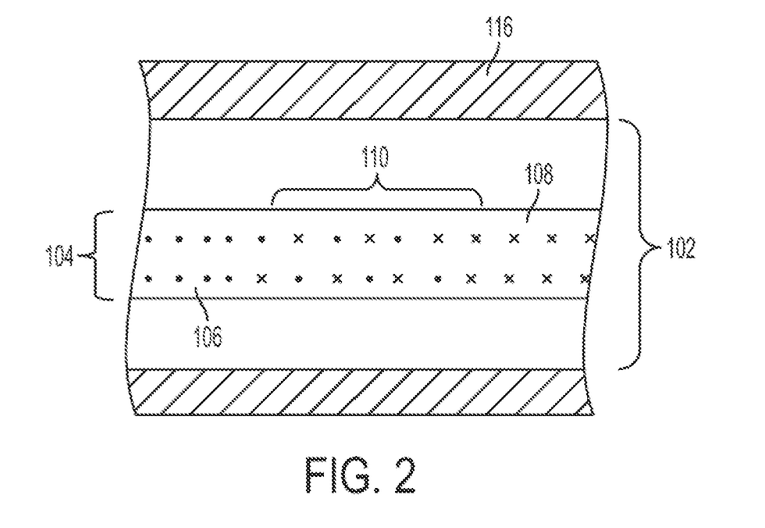
FIG. 2 is a schematic diagram of a section of hybrid fiber optic cable deployed within a wellbore, where regions of the hybrid fiber optic cable having different characteristics are spliced together, according to some aspects of the present disclosure.

FIG. 2 is a schematic diagram of a section of hybrid fiber optic cable 104 deployed within a wellbore 102, where regions of the hybrid fiber optic cable 104 having different characteristics are spliced together. In many aspects, heterogeneous regions of optical fiber can be concatenated in-line in a cable deployed in a wellbore 102. In some aspects, the coupled, heterogeneous regions can be a transmission region 106 and a sensory region 108 spliced together, where the section of splicing and overlap is the transition region 110 (also referred to as a transitionary fiber or a transitionary glass). In some aspects, the transmission region 106 and the sensory region 108 can each have an end cut or cleaved at an angle such that the two ends of fiber optic cable mirror each other, and physically couple with each other such that the core of the transmission region 106 fiber optic cable and the core of the sensory region 108 fiber optic cable are in alignment. In further aspects, the transmission region 106 and the sensory region 108 can be cleaved at an angle such that the cladding of the transmission region 106 fiber optic cable and the cladding of the sensory region 108 fiber optic cable are in alignment. As shown in FIG. 2, the transition region 110 of the hybrid fiber optic cable 104 is the interface between the transmission region 106 and the sensory region 108, where the transition region 110 is a splice having characteristics of both transmission region 106 and the sensory region 108.

Figure 3:
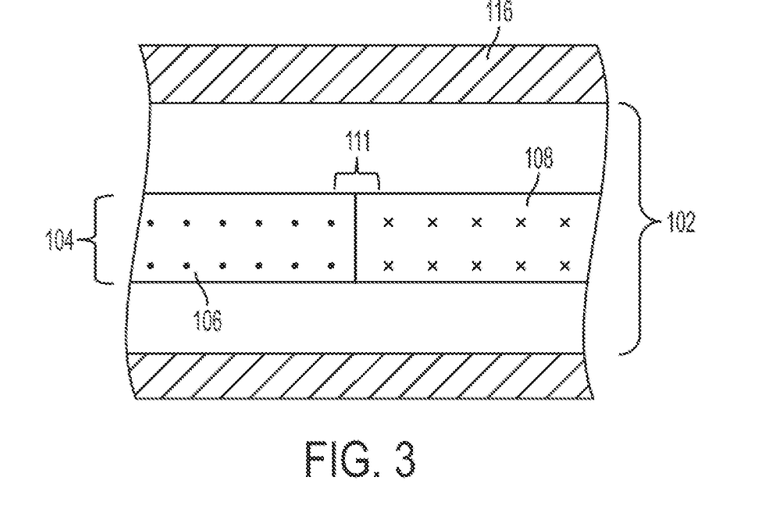
FIG. 3 is a schematic diagram of a section of hybrid fiber optic cable deployed within a wellbore, where regions of the hybrid fiber optic cable having different characteristics are coupled together at abutting ends, according to some aspects of the present disclosure.

FIG. 3 is a schematic diagram of a section of hybrid fiber optic cable 104 deployed within a wellbore 102, where regions of the hybrid fiber optic cable 104 having different characteristics are coupled together at abutting ends. In some aspects, the preform process for forming both the transmission region 106 fiber optic cable and the sensory region 108 fiber optic cable can be controlled such that the hybrid fiber optic cable 104 is formed directly through the preform process. In other aspects, transmission region 106 fiber optic cable and sensory region 108 fiber optic cable can each be formed separately, having flat ends, and be subsequently connected with a fusion splice, a welded splice, mechanically spliced holding the fiber optic cables, a physical-contact optical fiber connection (which can be angled), a lensed or expanded-beam connection with an air gap, or otherwise together to form a continuous hybrid fiber optic cable 104. In such aspects, the transition from one regime or region of fiber optic cable to another different regime or region of fiber optic cable can be a transition interface 111. The transition interface 111 can be a mechanical and optical coupling of a transmission region 106 and a sensory region 108 where either or both of the core and cladding of the transmission region 106 and a sensory region 108 are in alignment. In aspects as illustrated in FIG. 3, the transition interface 11 can be configured to reduce or mitigate any optical path changes due to any change in index of refraction ($I_R$) between the fiber optic regions.

Figure 4:
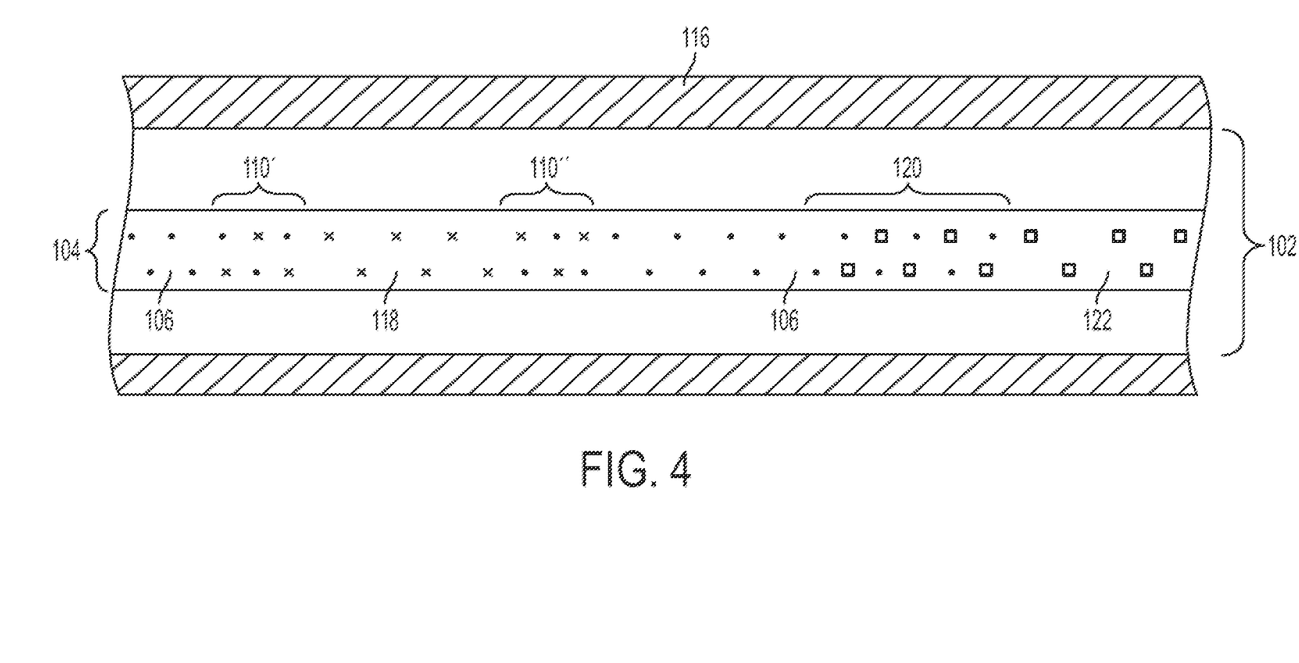
FIG. 4 is a schematic diagram of a section of hybrid fiber optic cable deployed within a wellbore, where the hybrid fiber optic cable has more than one region with different characteristics, according to some aspects of the present disclosure.

FIG. 4 is a schematic diagram of a section of hybrid fiber optic cable 104 deployed within a wellbore 102, where the hybrid fiber optic cable 104 has more than one region or regime with different characteristics. In some aspects, a hybrid fiber optic cable 104 can have more than one sensory region, and in further aspects, the hybrid fiber optic cable 104 can have sensory regions fabricated to measure or detect different aspects of the surrounding earth strata 116. Individual segments of sensory region can be manufactured, fabricated, or doped to collect sensory data relating to temperature, pressure, chemistry, seismic profile, or other features of earth strata 116. As shown in FIG. 4, a hybrid fiber optic cable 104 can include a transmission region 106 that is coupled to a first sensory region 118 across a first transition region lead 110'. The first sensory region 118 can be fabricated to scatter signal and collect backscatter signal, and particularly adapted to measure a first characteristic of the surrounding earth strata 116. The first sensory region 118 can be further coupled to another segment of transmission region 106 fiber optic cable across a first transition region tail 110". Both the first transition region lead 110' and the first transition region tail 110" can be structurally similar, splicing first sensory region 118 with transmission region 106 fiber optic cable on both the uphole and downhole side of the first sensory region 118.

At a different part of the hybrid fiber optic cable 104, a segment of transmission region 106 can mechanically and optically couple to a second sensory region 122 across a transition region 120. The second sensory region 122 can be fabricated to scatter signal and collect backscatter signal, and particularly adapted to measure a second characteristic of the surrounding earth strata 116. In some aspects, the transition region 120 connecting the second sensory region 122 to transmission region 106 can be a transition region lead, and in further aspects, the second sensory region 122 can have a transition region tail coupling the second sensory region 122 to a further segment of transmission region 106 on the side of the second sensory region 122 opposite to the transition region lead. In some aspects, a hybrid fiber optic cable 104 can have a tertiary sensory region, and in further aspects, a hybrid fiber optic cable 104 can have more than three sensory regions along the overall length of the hybrid fiber optic cable 104.

In some aspects, the first sensory region 118, the second sensory region 122, and any further sensory regions can be manufactured and doped to particularly measure and detect he same characteristic of earth strata 116. In such aspects, the same type of data can be collected from multiple segments of the hybrid fiber optic cable 104 at different depths along the tool string.

In other aspects, a first sensory region 118 and a second sensory region 122 can be mechanically and optically coupled to each other without a transmission region in between the two sensory regions. In such aspects, the first sensory region 118 and the second sensory region 122 can have a spliced transition region or a flat transition interface between the two sensory regions.

In further aspects, the first sensory region 118 and the second sensory region 122 can each react differently to various wavelengths of signal received from the interrogator system 112. In particular, the first sensory region 118 may have ideal performance when receiving a light source signal at a first wavelength, while the second sensory region 122 may have ideal performance when receiving a light source signal at a second wavelength different and relatively distant from the first wavelength. Accordingly, the interrogator system 112 can send light source signals down the hybrid fiber optic cable 104 at more than one wavelength to maximize the scattering and emission of signals from any given sensory region. In some aspects, the interrogator system 112 can send light source signals having a wavelength ($\lambda$) of about 1050 nm to about 1550 nm down a hybrid fiber optic cable 104. In other aspects, the interrogator system 112 can send light source signals having a wavelength (λ) of about 600 nm, about 795 nm, about 800 nm, about 850 nm, about 990 nm, about 1050 nm, about 1550 nm, about 1650 nm, about 2000 nm, about 2100 nm, about 2400 nm, at any range of wavelengths bounded by these wavelengths, or at any increment or gradient thereof within or at such ranges. In other aspects, the interrogator system 112 can send light source signals having wavelengths (λ) in the C-band, L-band, or U-band of the electromagnetic spectrum.

In further aspects, each of the transmission region 106, first sensory region 118, second sensory region 122, and any further regions of hybrid fiber optic cable 104 can be selected or configured to have particular dispersion characteristics, achieving dispersion compensation along the length. The transmission region 106, first sensory region 118, second sensory region 122, or other fiber optic regions can be designed to have a positive dispersion structure, a zero dispersion structure, or a negative dispersion structure. Accordingly, the pulse width of a light source signal can be controlled along the length of the hybrid fiber optic cable 104, such that as a signal passes through the hybrid fiber optic cable 104, the light pulse can be compressed or expanded as appropriate for transmission or scattering when passing through either a transmission region 106 or sensory region 118, 122.

Figure 5:
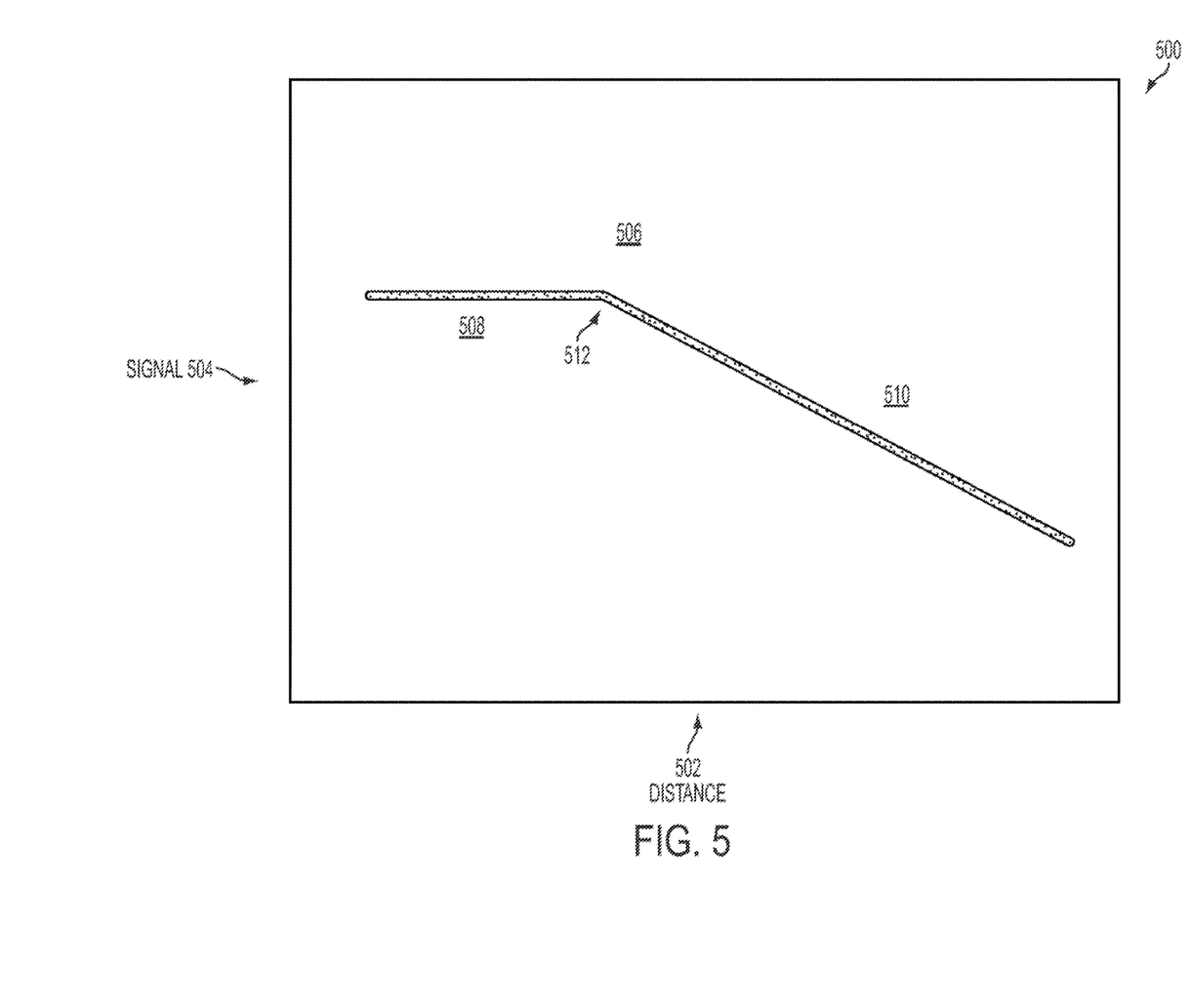
FIG. 5 is an illustration of the relation between signal loss over a distance or length of cable for a hybrid fiber optic cable, according to some aspects of the present disclosure.

FIG. 5 is an illustration 500 of the general relation between signal 504 loss over a distance 502 for a hybrid fiber optic cable. The plot of signal loss over distance 506 is shown where distance 502 (i.e. the length of cable) is represented on the x-axis and signal 504 strength is represented on the y-axis. In standard fiber optics, the signal 504 strength typically decreases over the length of fiber optic cable. In the present disclosure of hybrid fiber optic cable, however, the amount and region of signal loss is more precisely controlled to minimize signal loss until reaching a sensory region of the hybrid fiber optic cable. In particular, the plot of signal loss over distance 506 shows two distinct regions, an ultra-low loss region 508 and a heavily doped region 510. The ultra-low loss region 508 corresponds to a transmission region, where the strength of the signal 504 sent through the hybrid fiber optic cable remains at generally constant strength. In some aspects, the ultra-low loss region 508 can be a region where attenuation of the signal 504 is less than about 0.2 decibels per kilometer (<0.2 dB/km). The heavily doped region 510 corresponds to a sensory region, where the strength of the signal 504 decreases as the signal scatters, due to encountering and reflecting off of doping elements in the heavily doped region 510 of the hybrid fiber optic cable. In some aspects, the heavily doped region 510 can have a signal attenuation of greater than about one decibel per kilometer (>1.0 dB/km), greater than about three decibels per kilometer (>3.0 dB/km), or greater than about four decibels per kilometer (>4.0 dB/km). The degree of signal attenuation is at least in part dependent on the wavelength of light source signal 504 sent through the hybrid fiber optic cable. The bend 512 in the plot of signal loss over distance 506 can represent the transition region where a transmission region and sensory region interface. In some aspects, the bend 512 can be gradual or sharp, depending on the particular characteristics of the ultra-low loss region 508 fiber optic cable and the heavily doped region 510 fiber optic cable.

Figure 6:
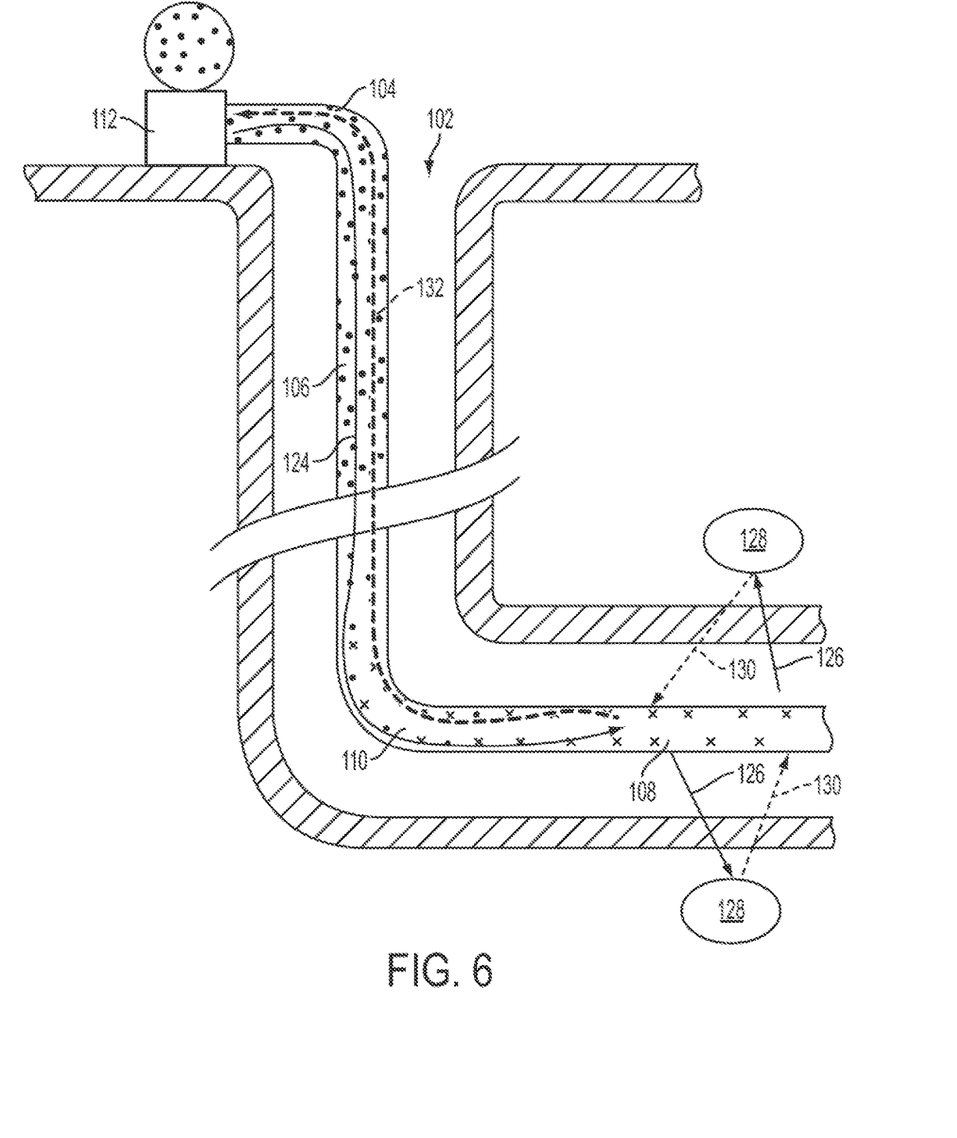
FIG. 6 is a schematic diagram of a well system in which a hybrid fiber optic cable can be deployed, further illustrating the progression of signals sent through, emitted from, and acquired by the hybrid fiber optic cable, according to some aspects of the present disclosure.

FIG. 6 is a schematic diagram of a well system in which a hybrid fiber optic cable 104 can be deployed, further illustrating the progression of signals sent through, emitted from, and acquired by the hybrid fiber optic cable 104. As noted above, in aspects, a hybrid fiber optic cable 104 can be several kilometers long, or as long as necessary to reach the toe of any given wellbore 102. As shown in FIG. 6, a wellbore 102 having a horizontal region through which the hybrid fiber optic cable 104 can be deployed can be located proximate to formations 128 in the earth strata 116. Formations 128 in the earth strata 116 can be up to several thousand meters distant from the wellbore 102 and remain within the functional range of a given sensory region 108. In many aspects, the interrogator system 112 can send a primary signal 124 downhole through the hybrid fiber optic cable 104. When the primary signal 124 reaches the sensory region 108 of the hybrid fiber optic cable 104, the sensory signal 124 is at least in part reflected, deflected, or scattered outward into the earth strata 116 as emission signal 126. The emission signal 126 can encounter the formations 128 in the earth strata 116 and reflect off of the formations 128, resulting in backscatter signal 130. A portion of the backscatter signal 130 reflected from the formations 128 can be collected by the hybrid fiber optic cable 104. A further portion of the backscatter signal 130 can be collected from reflections of the emission signal 126 off of the earth strata 116. The collected backscatter signal 130 can then return uphole through the hybrid fiber optic cable 104 as sensory signal 132 to interrogator system 112. At the interrogator system 112, the sensory signal 132 can be measured, analyzed, or otherwise processed for determination of physical characteristics of the earth strata 116 and formations 128 proximate to the wellbore 102 and sensory region 108.

Deployment implementation of a hybrid fiber optic cable in a wellbore can vary depending on the desired duration of use. In some aspects, a hybrid fiber optic cable can be deployed permanently, along the earth strata wall of a wellbore, and secured in place as a cement casing (also referred to as a parent casing) is poured along the walls of the wellbore. When deployed as part of the parent casing, the hybrid fiber optic cable is held within the cement that forms the parent casing, and provides for a permanent sensory tool for a well system. In other aspects, a hybrid fiber optic cable can be deployed semi-permanently, or for a relatively long-term deployment, as mounted to a tool string, mandrel, tubing, or other such casing forming a production tube within a wellbore. When deployed as mounted to a production tube, the hybrid fiber optic cable can remain in a wellbore for the duration of production from the well system, providing a sensory tool for as long as the overall tool string or production tube remains in the wellbore. In such aspects, the hybrid fiber optic cable can remain in a wellbore along with the production tube for several years. In further aspects, a hybrid fiber optic cable can be deployed temporarily, for a "dip-in" into a wellbore, to take a reading of the wellbore environment and earth strata proximate to the wellbore, and then remove the hybrid fiber optic cable. When deployed for such short-term or temporary sensing, the hybrid fiber optic cable can be coupled to and independently suspended by a mobile wench, tractor, or other mobile deployment apparatus. In aspects of the present disclosure where the deployment of hybrid fiber optic cable is not permanent, the hybrid fiber optic cable can be reused in subsequent wellbore and well systems, reducing the overall cost of using hybrid fiber optic cable, which can be several kilometers in length.

In various aspects, depending on the depth of well a hybrid fiber optic cable is designed to be deployed within, the ratio of transmission region (or multiple transition regions) to sensory region fiber optic cable can vary as needed, and can be determined by the design of any given wellbore. In some aspects, e.g. for relatively shallow wellbores, a hybrid fiber optic cable can be about 5% transmission region and about 95% sensory region. In other aspects, a hybrid fiber optic cable can be about 10% transmission region and about 90% sensory region. In further aspects, a hybrid fiber optic cable can be about 25% transmission region and about 75% sensory region. In other aspects, a hybrid fiber optic cable can be about 33% transmission region and about 67% sensory region. In some aspects, a hybrid fiber optic cable can be about 40% transmission region and about 60% sensory region. In other aspects, a hybrid fiber optic cable can be about 50% transmission region and about 50% sensory region. In further aspects, a hybrid fiber optic cable can be about 60% transmission region and about 40% sensory region. In some aspects, a hybrid fiber optic cable can be about 67% transmission region and about 33% sensory region. In other aspects, a hybrid fiber optic cable can be about 75% transmission region and about 25% sensory region. In some aspects, a hybrid fiber optic cable can be about 90% transmission region and about 10% sensory region. In other aspects, e.g. for wellbores where the region of interest is relatively deep downhole or relatively narrow, a hybrid fiber optic cable can be about 95% transmission region and about 5% sensory region. In further aspects, a hybrid fiber optic cable can have a transmission region that is about 5%-95% the length of the overall hybrid fiber optic cable and can have a sensory region that is about 95%-5% the length of the overall hybrid fiber optic cable. In such aspects, either or both of transmission regions and sensory regions of the hybrid fiber optic cable can be located in a vertical, horizontal, diagonal, or bending portion of a wellbore.

With these aspects in mind, it will be apparent from this description that aspects of the described techniques may be embodied, at least in part, in software, hardware, firmware, or any combination thereof. It should also be understood that aspects can employ various computer-implemented functions involving data stored in a data processing system. That is, the techniques may be carried out in a computer or other data processing system in response executing sequences of instructions stored in memory. In various aspects, hardwired circuitry may be used independently, or in combination with software instructions, to implement these techniques. For instance, the described functionality may be performed by specific hardware components, such as an interrogator system, containing hardwired logic for performing operations, or by any combination of custom hardware components and programmed computer components. The techniques described herein are not limited to any specific combination of hardware circuitry and software.

The subject matter of aspects and examples of this patent is described here with specificity to meet statutory requirements, but this description is not necessarily intended to limit the scope of the claims. The claimed subject matter may be embodied in other ways, may include different elements or steps, and may be used in conjunction with other existing or future technologies. Throughout this description for the purposes of explanation, numerous specific details are set forth in order to provide a thorough understanding of examples and aspects of the subject matter disclosed herein. It will be apparent, however, to one skilled in the art that the many examples or aspects may be practiced without some of these specific details. In some instances, structures and devices are shown in diagram or schematic form to avoid obscuring the underlying principles of the described examples or aspects. This description should not be interpreted as implying any particular order or arrangement among or between various steps or elements except when the order of individual steps or arrangement of elements is explicitly described.

The foregoing description of the disclosure, including illustrated aspects and examples has been presented only for the purpose of illustration and description and is not intended to be exhaustive or to limit the disclosure to the precise forms disclosed. Numerous different modifications, adaptations, and arrangements of the components depicted in the drawings or described above, as well as components and steps not shown or described, are possible. Similarly, some features and subcombinations are useful and may be employed without reference to other features and subcombinations. Examples and aspects of the subject matter have been described for illustrative and not restrictive purposes, and alternative examples or aspects will become apparent to those skilled in the art without departing from the scope of this disclosure. Accordingly, the present subject matter is not limited to the examples or aspects described above or depicted in the drawings, and various embodiments, examples, aspects, and modifications can be made without departing from the scope of the claims below.

That which is claimed is:

1. A hybrid fiber optic assembly for use in a well, comprising:
   a hybrid fiber optic cable having at least a first transmission region and at least a first sensory region, wherein the first sensory region has a signal attenuation of greater than about 1.0 decibel per kilometer; and
   an interrogator system coupled to the hybrid fiber optic cable.

2. A hybrid fiber optic assembly according to claim 1, further comprising a first transition region optically coupling the first transmission region and the first sensory region.

3. A hybrid fiber optic assembly according to claim 2, wherein the first transition region is a splice between the first transmission region and the first sensory region.

4. A hybrid fiber optic assembly according to claim 2, wherein the first transition region is a fusion between a blunt end of the first transmission region and a blunt end of the first sensory region.

5. A hybrid fiber optic assembly according to claim 1, wherein the first transmission region has a signal attenuation of less than about 0.2 decibels per kilometer.

6. A hybrid fiber optic assembly according to claim 1, further comprising a fiber optic coil coupled to the interrogator system and is arranged to be deployed as part of the hybrid fiber optic cable within the well.

7. A hybrid fiber optic assembly according to claim 1, wherein the first transmission region is about 5%-95% of a length of the hybrid fiber optic cable and wherein the first sensory region is about 95%-5% of the length of the hybrid fiber optic cable.

8. A hybrid fiber optic assembly according to claim 1, wherein the hybrid fiber optic cable further comprises at least a second transmission region and at least a second sensory region.

9. A hybrid fiber optic assembly according to claim 8, wherein the first transmission region and the second transmission region are about 5%-95% a length of the hybrid fiber optic cable and wherein the first sensory region and the second sensory region are about 95%-5% the length of the hybrid fiber optic cable.

10. A hybrid fiber optic assembly according to claim 8, further comprising a first transition region optically coupling the first transmission region and the first sensory region, a second transition region optically coupling the first sensory region to the second transmission region, and a third transition region optically coupling the second transmission region to the second sensory region.

11. A hybrid fiber optic assembly according to claim 1, wherein at least the first sensory region has a fiber optic core that is doped to increase an index of refraction of the fiber optic core.

12. A hybrid fiber optic assembly according to claim 1, wherein at least the first sensory region has a fiber optic cladding that is doped to decrease an index of refraction of the fiber optic cladding.

13. A fiber optic sensory system deployed in a wellbore comprising:
   a hybrid fiber optic cable having at least a first transmission region and at least a first sensory region, wherein the first sensory region is operable to emit an emission signal into surrounding earth strata and is further operable to receive backscatter signal from the earth strata;
   an interrogator system coupled to the hybrid fiber optic cable, the interrogator system operable to receive a sensory signal from the hybrid fiber optic cable; and
   a wellbore parent casing.

14. A fiber optic sensory system according to claim 13, wherein the hybrid fiber optic cable is encased within the wellbore parent casing.

15. A fiber optic sensory system according to claim 13, further comprising a production tube deployed within the wellbore, wherein the hybrid fiber optic cable is coupled to the production tube.

16. A fiber optic sensory system according to claim 13, wherein the hybrid fiber optic cable is independently suspended within the wellbore.

17. A method of distributed sensing of characteristics in earth strata, comprising:
   deploying a hybrid fiber optic cable within a wellbore, the wellbore being surrounded by earth strata;
   pulsing, with an interrogator system coupled to the hybrid fiber optic cable, the hybrid fiber optic cable including at least a transmission region and at least a sensory region, a primary signal downhole through the at least the transmission region;
   emitting, at least at the sensory region, an emission signal into the earth strata;
   receiving backscatter signal from the earth strata; and
   transmitting a sensory signal uphole to the interrogator system through the hybrid fiber optic cable.

18. A method according to claim 17, wherein the interrogator system pulses a laser as the primary signal, the laser generating light having a wavelength length of about 1050 nm to about 1550 nm.

19. A method according to claim 17, wherein the interrogator system is controllable to pulse primary signals at various frequencies.

* * * * *